United States Patent [19]

Jones

[11] Patent Number: 4,614,562
[45] Date of Patent: Sep. 30, 1986

[54] TIRES BUILDING MACHINE WITH RIGID RADIALLY EXPANSIBLE DRUM

[75] Inventor: Robert F. Jones, Westfield Center, Ohio

[73] Assignee: The B. F. Goodrich Company, Akron, Ohio

[21] Appl. No.: 639,763

[22] Filed: Aug. 13, 1984

[51] Int. Cl.⁴ .................... B29D 30/34; B29D 30/26
[52] U.S. Cl. .................................. 156/420; 156/402; 156/403; 156/410
[58] Field of Search .............................. 156/414–420, 156/394.1, 398, 400, 402, 403, 408–410

[56] References Cited

U.S. PATENT DOCUMENTS

| | | | |
|---|---|---|---|
| 3,536,566 | 10/1970 | Frazier et al. | 156/415 |
| 3,867,229 | 2/1975 | Marra | 156/420 X |
| 4,229,246 | 10/1980 | Vanderzee | 156/403 X |

*Primary Examiner*—Edward Kimlin.
*Assistant Examiner*—Thomas Bokan
*Attorney, Agent, or Firm*—Harry F. Pepper, Jr.; Alfred D. Lobo

[57] ABSTRACT

A simple two-stage process is disclosed for economic mass production of premium-quality heavy-duty belted tubeless and tube-type radial truck tires of various sizes using standard 30-year-old semi-automatic tire building machines heretofore used in the manufacture of bias-ply tires by the flat-band process. The old automatic machines are modified at minimal cost to receive a unique rigid expansible drum which is radially expanded 35% or more during the first-stage tire building operation. The drum may be adjusted to make tires of various widths and diameters and has a series of closely spaced radially movable segments defining a rigid segmental open-ended externally cylindrical shell having an annular rubber cover on which a complete green tire carcass is built prior to application of the belts and the tread at the second-stage machine.

The shell has rigid beveled shoulders at the ends of the drum which are inclined at an angle of from 40° to 50° relative to the drum axis and which are shaped to facilitate high-speed production, and to permit effective use of the ply turn-up tools and stitching means normally used on such automatic tire building machines with open-ended cylindrical drums. The rubber-covered shell expands radially in a precisely controlled manner in response to rotation of the drum, and it maintains uniform cord spacing and prevents the formation of wrinkles and air pockets during the ply down and ply turn-up operations. The unique drum facilitates accurate positioning of the wire beads and more precise control of bead-to-bead cord lengths and provides an ideal support during the stitching operations at the drum shoulders so as to improve tire quality and uniformity.

7 Claims, 16 Drawing Figures

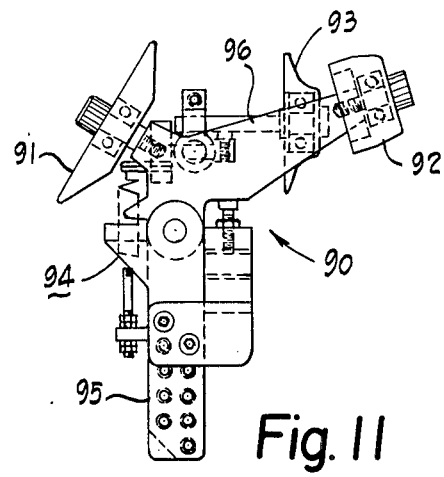
Fig. 11
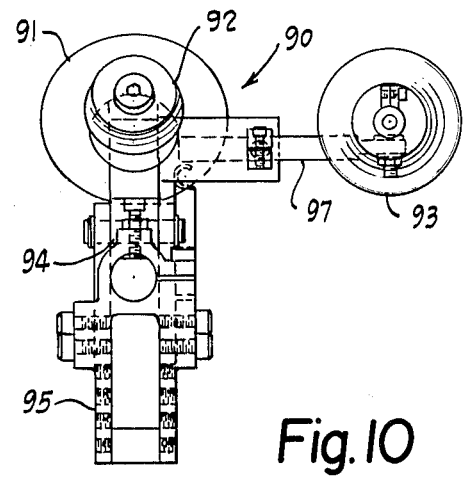
Fig. 10
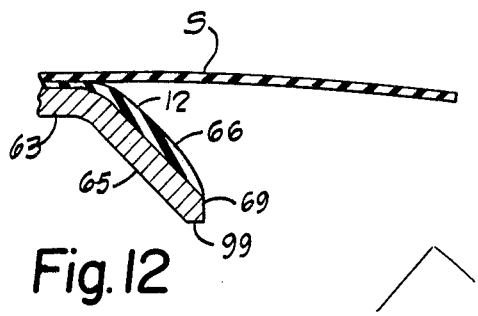
Fig. 12
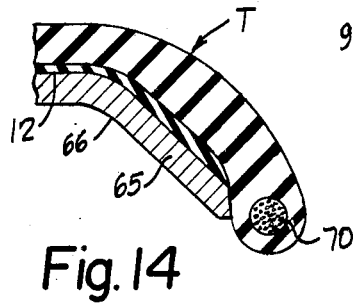
Fig. 14
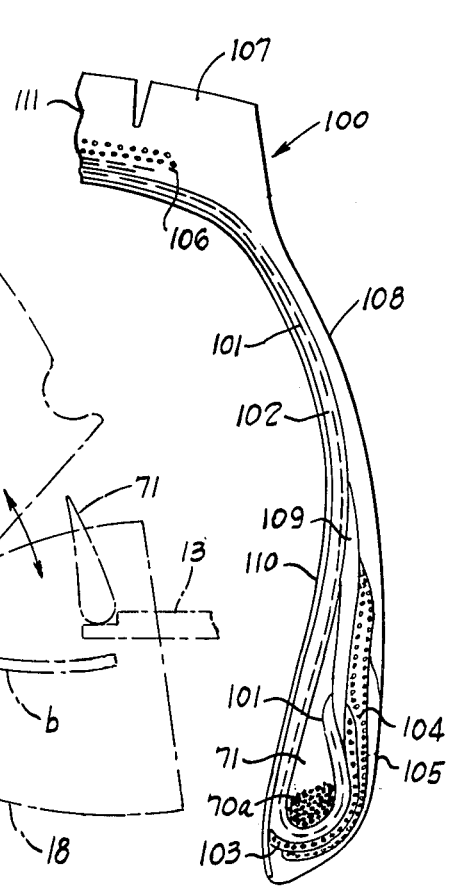
Fig. 13
Fig. 15

TIRES BUILDING MACHINE WITH RIGID RADIALLY EXPANSIBLE DRUM

BACKGROUND OF THE INVENTION

The invention relates to a unique rigid radially expansible drum for manufacture of large pneumatic tires such as heavy-duty tires and to the use of such drum on existing bias tire building machines to produce tubeless and tube-type radial tires.

For more than three decades automatic or semi-automatic tire building machines have been employed by tire manufacturers to build bias-ply tires. The complete green tire is built-on a cylindrical or high-crown fixed-diameter drum and thereafter expanded to toroidal shape in a vulcanizing mold. (see U.S. Pat. Nos. 2,381,379; 2,394,318; 2,464,020 and 2,488,340). The tire building operations are carried out commercially on automatic or semi-automatic tire building machines, such as the Model 49 or Model 59J described hereinafter or other tire building machines sold by National Rubber Machinery Company (NRM) or other manufacturers, including the NRM Models 39, 40, 50, 59H, 61B and 611.

The circumferential belts used on radial and bias/-belted tires prevent building of such tires by the old single-stage process used for bias-ply tires because of the pantographing problem when the tire is expanded from the cylindrical to the toroidal shape. For this reason the carcasses of radial tires must be expanded before the circumferential belts and the tread are applied to form the green tire.

In a typical process for making radial tires, the tire building operation is carried out in two stages. In the first stage the carcass is formed and the underply is turned over the beads. This may involve use of an expansible drum as in U.S. Pat. Nos. 3,560,301; 3,637,450, 3,684,621; 3,740,293; 3,784,437; 4,131,500; 4,151,035 and 4,312,696. The carcass is usually formed in a generally cylindrical shape as shown, for example, in U.S. Pat. Nos. 3,536,566; 3,560,301; 3,616,059; 3,740,293 and 3,795,564. In the second stage the carcass is expanded substantially before applying the circumferential belts and the tread is disclosed, for example, in U.S. Pat. Nos. 3,560,301; 3,560,302; 3,565,062; 3,637,450; 3,674,604; 3,684,621; 3,740,293; 3,784,437; 3,833,445; 4,214,939; 4,243,451; and 4,312,696. A typical machine has bead locking means which expands against the inside of the bead rings to shape or grip the beads and which moves axially inwardly as the green tire expands radially (see U.S. Pat. Nos. 3,674,604; 3,833,445; 4,214,939; and 4,243,451).

Both the first- and second-stage tire building operations may be carried out on the same expansible drum as disclosed in many of the above-mentioned patents including U.S. Pat. Nos. 3,637,450; 3,684,621; 3,740,293; 3,795,564 and 3,873,397. On the other hand, it is common practice to build the carcass in stage one at one machine and then to transfer to another machine for application of the belts and the tread as disclosed for example in U.S. Pat. Nos. 4,131,500 and 4,151,035. A special expansible drum or other suitable means may be provided at the stage-II machine to expand the transferred stage-I carcass before the tread is applied as disclosed, for example, in U.S. Pat. Nos. 3,560,302; 3,674,604; 4,214,941 and 4,325,764.

Because of the problems involved with radial tires, special drums are employed for building the carcass in stage I. The old semi-automatic flat-band machines used for producing bias-ply truck tires, such as the NRM Models 49 and 59J described above, were generally considered unsuitable for that purpose.

Serious problems arise in the two-stage process when attempting to build tubeless radial tire carcasses on a cylindrical drum because of bead rotation problems when using wire beads of hexagonal-shaped or non-circular cross-section as are required in tubeless tires to maintain a proper seal at the wheel rim. If a tubeless truck tire carcass is built in cylindrical form in stage I and then expanded in stage II to toroidal shape, the bead rotation problem can be catastrophic because of the elongated cross section of the wire bead and the heavy construction in the bead region. For this reason such a process is unsuitable and not used for making standard heavy-duty tubeless truck tires. However, the process can be used for manufacturing tube-type truck tires having wire beads of generally circular cross-section (FIG. 13) or tubeless passenger car tires with a simple bead construction not seriously damaged by bead rotation in the stage II expansion.

The use of tubes in truck tires is highly undesirable particularly because of interference with tire cooling and the resulting decrease in service life. Heat build-up and resulting hot spots lead to early tire failure and rapid tire wear. Tubeless truck tires run cooler, are safer and have a longer service life. They are far superior to tube-type tires, but a high percentage of heavy-duty truck tires are still of the less expensive tube type. The special equipment and special methods heretofore required to build tubeless truck tires are slow and expensive and greatly limit the use of such tires. This problem has been recognized in the tire industry for several decades, and heretofore no practical solution was found. Prior to the present invention the industry had no simple and practical way to mass produce tubeless radial truck tires at low cost.

Some of the serious problems encountered in building tires are of small consequence when building smaller passenger car tires. For example, a practical and economical way to build a radial tire is the two-stage process commonly used for building passenger car tires wherein the carcass is built in cylindrical form on a cylindrical drum and then transferred to a stage II machine where it is mounted on a pair of axially movable bead-supporting rings, each being shaped like a train wheel and having a radially projecting annular rim flange for engaging and supporting the tire bead (see U.S. Pat. No. 3,923,572). The rim flange provides an air-tight seal at the bead so that the radial tire carcass can be expanded by internal air pressure in stage II from a cylindrical to a toroidal shape as the "train wheels" are moved axially towards each other.

The above process requires "buttoning" the cylindrical tire carcass over the "train wheels" so that both of the rim flanges are inside the tire beads. It is practical to do this with light-weight passenger car tires because the central half of the carcass is easily deformed. However, a heavy-duty truck tire carcass is too stiff to permit such a "buttoning" operation unless it is built in a semi-toroidal shape. Prior to the present invention in building tires the train wheels had to be reversed to locate the rim flanges on the outside and thereby eliminate the "buttoning" operation (see U.S. Pat. Nos. 3,342,663 and 4,214,941). This reversal of the flanges creates an air leakage problem during the stage II radial expansion of the cylindrical truck tire carcass. When leakage occurs the tire carcass is not supported properly during the expansion, the diameter of the expanded carcass cannot be controlled, and the quality of the tire is seriously denigrated. In spite of these deficiencies, the process continues to be used for manufacture of tube-type truck tires because of the higher rate of production and lower cost as compared to other more complicated methods.

During the last two decades, tire manufactures have attempted to improve the quality and reduce the cost of radial truck tires by use of complicated and expensive two-stage automatic tire building machines. Such machines are disclosed, for example, in U.S. Pat. No. 3,740,293 and in *Rubber World,* July 1979, pg 59. Bladder means are usually employed to carry out the ply turn up, turn down and stitching operations during building of the stage-I carcass. Unfortunately the machines have been too slow and inefficient to justify the large capital investment and have not provided tires of optimum quality. Another disadvantage of these expensive two-stage machines is the lack of versatility and the inability to produce truck tires in many different sizes. This is particularly true of tire building machines having drums with means to expand the tire to a near toroidal shape before the circumferential belts and the tread are applied. The construction of such drums is such as to interfere with or prevent the use of adjustable drums such as disclosed in U.S. Pat. Nos. 3,837,968 and 4,220,494.

The two-stage processes for building tubeless and tube-type radial tires encounter problems in quality control due to lack of precision in locating the bead rings and carcass material and the inability to control the bead-to-bead cord length during the tire building operation. The need for greater precision in the manufacture of radial truck tires has long been recognized.

For many years it has been common practice to build large tires on rigid high-crown drums having a diameter substantially greater than that of the wire bead rings as shown, for example, in U.S. Pat. No. 3,405,023 and on page 15 of *Rubber Developments,* Vol 30, No. 1, 1977. This procedure produces tires with defects near the bead region due to the wrinkles, folds and air pockets formed during the ply-down operation prior to setting of the beads and during the ply turn-up operation and does not provide the uniform high quality required in modern truck tires.

SUMMARY OF THE INVENTION

The present invention involves simple but revolutionary solutions to the above problems including changes in existing 30-year-old truck tire building machines which make it possible for such machines to mass produce anomaly-free belted tubeless and tube-type radial truck tires which meet the highest quality and safety standards.

Application of the invention to existing bias tire building machines, such as the Model 59J, involves simple modifications of the machine. It requires replacing the usual drum designated to make green bias-ply tires with a unique adjustable rigid radially expansible drum specially designed to make heavy-duty truck tires, to minimize bead rotation problems, to maintain uniformity, to eliminate defects in the bead region of the tire, and to produce a generally semi-toroidal shape.

The drum of this invention has a series of closely spaced segments mounted to move radially and defining a segmental open-ended externally cylindrical shell which may be expanded 35% or more. The drum has beveled shoulders of substantial length at the ends of the drum inclined at an angle of from 40° to 50° relative to the drum axis and has cover plates bridging the gaps across the crown of the drum between the expanded segments. It also has an annular elastic cover extending the full length of the drum. The drum is readily adjustable both in length and in diameter so that it can produce tires of many different sizes including single-bead and dual-bead tires. The drum can be precisely controlled during its radial expansion and remains rigid in all of its radially adjusted positions. This helps to provide precision in the bead setting and stitching operations and close control of the bead-to-bead cord length. The rubber-cover on the drum is remarkably effective in providing uniform cord spacing during the radial expansion. Such expansion with the ply material wrapped around the drum eliminates wrinkles, folds and air pockets which would otherwise be formed during the ply-down and ply turn-up operations. The beveled shoulders provide an ideal rigid support during the tire building operations for rapid location and application of additional tire components so that high-quality anomaly-free tire carcasses can be produced rapidly and in the most efficient manner.

The drum can utilize the semi-automatic equipment of existing 30-year-old bias tire building machines including the ply turn-up and stitching means heretofore used for decades in the manufacture of bias-type tires. The green tire carcass formed on the drum in stage I has a shape which facilitates the "buttoning" operation at the stage-II machine so that the bead-supporting rings of the latter can be used as originally intended with the bead flanges inside the tire as it is expanded radially by internal air pressure. As a result the application of the circumferential belts and the tread portion can be effected in stage II rapidly and accurately at minimum cost using old machines to produce radial truck tires of the highest quality.

An object of the present invention is to provide a simple two-stage process which permits high-speed mass production of heavy-duty radial truck tires but does not require substantial capital investment in new equipment.

A further object of the invention is to provide a simple adjustable tire building drum capable of producing tubeless truck tires of superior quality in a wide variety of sizes without bead rotation problems when used for high speed production of 30-year-old semi-automatic tire building machines.

Another object of this invention is to provide a simple process which assures even cord spacing around the tire carcass.

Still another object of the invention is to provide an economical process for building large heavy-duty tires which minimizes defects in the bead and sidewall regions and assures uniform high quality.

BRIEF DESCRIPTION OF THE DRAWINGS

The foregoing and other objects and advantages of my invention will appear more fully from the following description, made in connection with the accompanying drawings of preferred embodiments of the invention, wherein like reference characters refer to the same or similar parts throughout the several views and in which:

FIG. 10 is an end view (see FIG. 3) on a reduced scale showing stitching means as are commonly used on the machine of FIGS. 1 to 4;

FIG. 11 is a front elevational view of the stitching means of FIG. 10;

FIG. 12 is a fragmentary schematic view on a reduced scale showing a sheet of tire cord material as applied to the drum to initiate building of a tire carcass;

FIG. 13 is a fragmentary schematic sectional view on a reduced scale showing the carcass on the expanded drum after the tire cord material is turned up over the beads and showing in broken lines, the carcass material before turn-up, a bead on the cylindrical bead setter, and also two positions of a conventional turn-up wheel during the building of a tire;

FIG. 14 is a fragmentary schematic sectional view on the same reduced scale as FIG. 13 showing an uncured steel-belted radial tire made according to the present invention prior to application of the circumferential belts and the tread; and FIG. 15 is a fragmentary sectional view with cross hatching omitted, showing a tubeless radial truck tire made by the two-stage process of this invention.

DETAILED DESCRIPTION OF THE PREFERRED EMBODIMENTS

Figure 3:
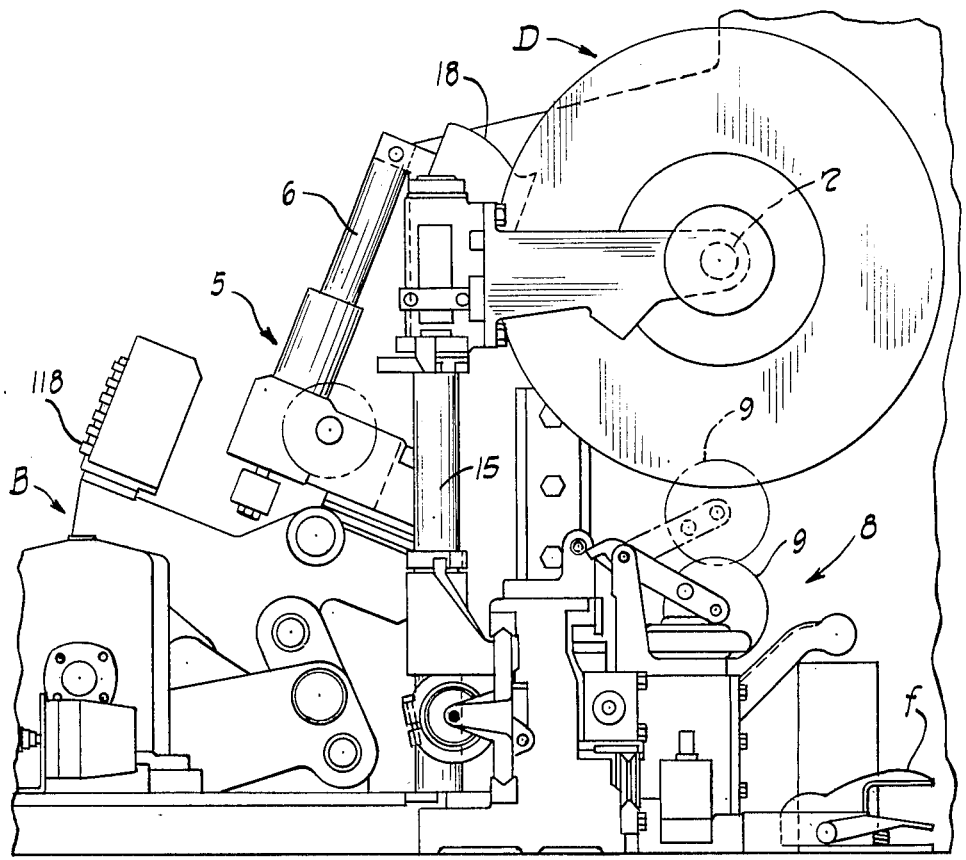
FIG. 3 is an end view of the machine of FIGS. 1 and 2 on a larger scale.
Figure 4:
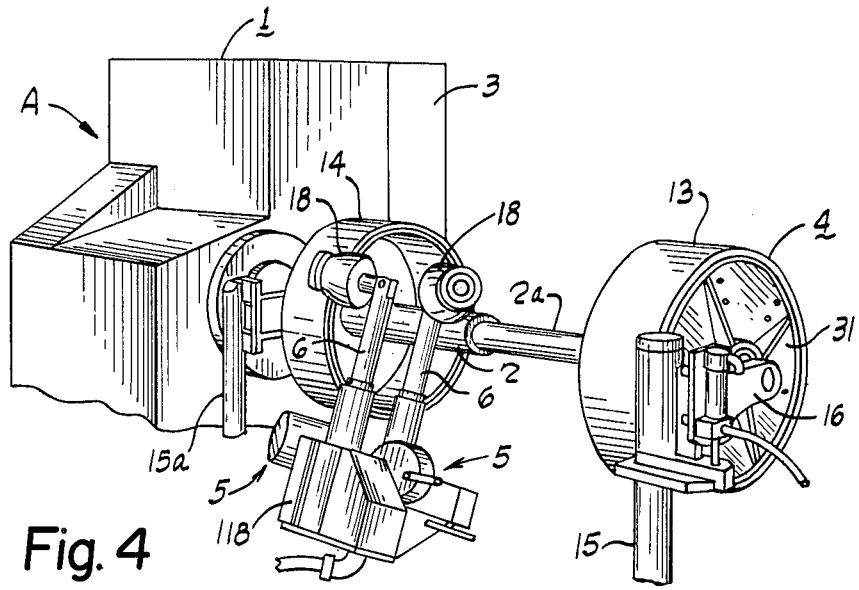
FIG. 4 is a fragmentary perspective view of the tire building machine.
Figure 5:
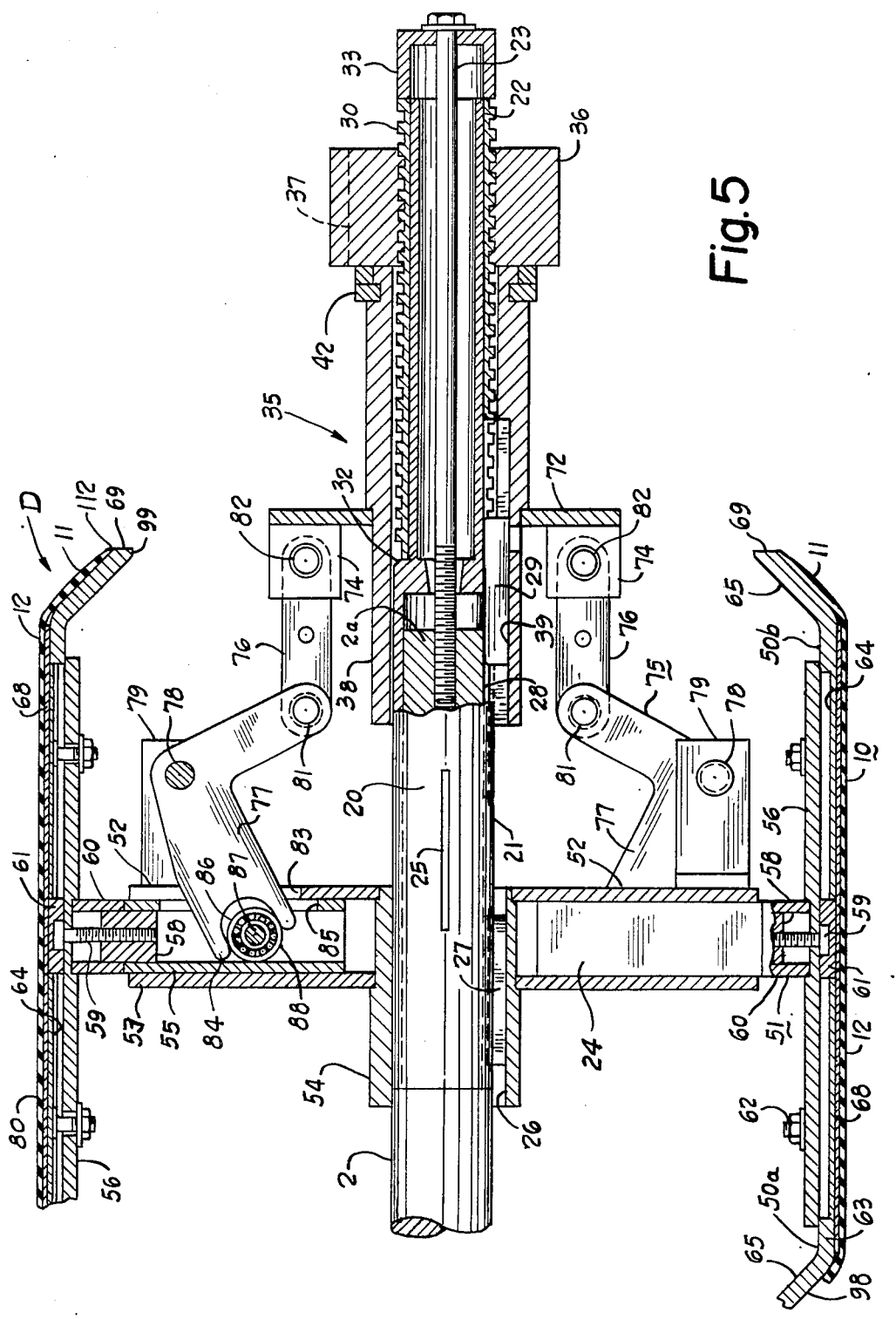
FIG. 5 is a vertical sectional view on a reduced scale looking from the rear, showing an expansible drum constructed according to this invention and mounted on the machine of FIGS. 1 to 4.
Figure 6:
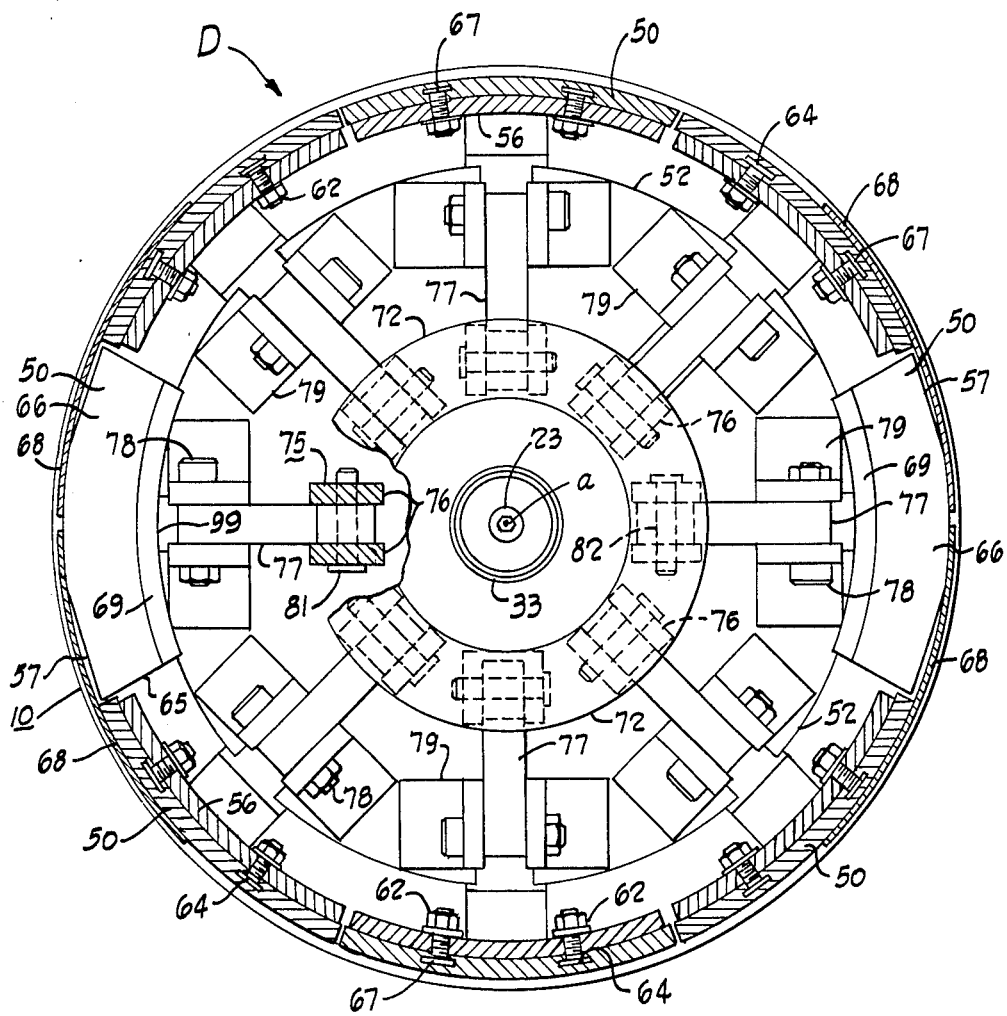
FIG. 6 is a vertical sectional view of the retracted expansible drum with parts omitted taken in a plane perpendicular to the drum axis.
Figure 7:
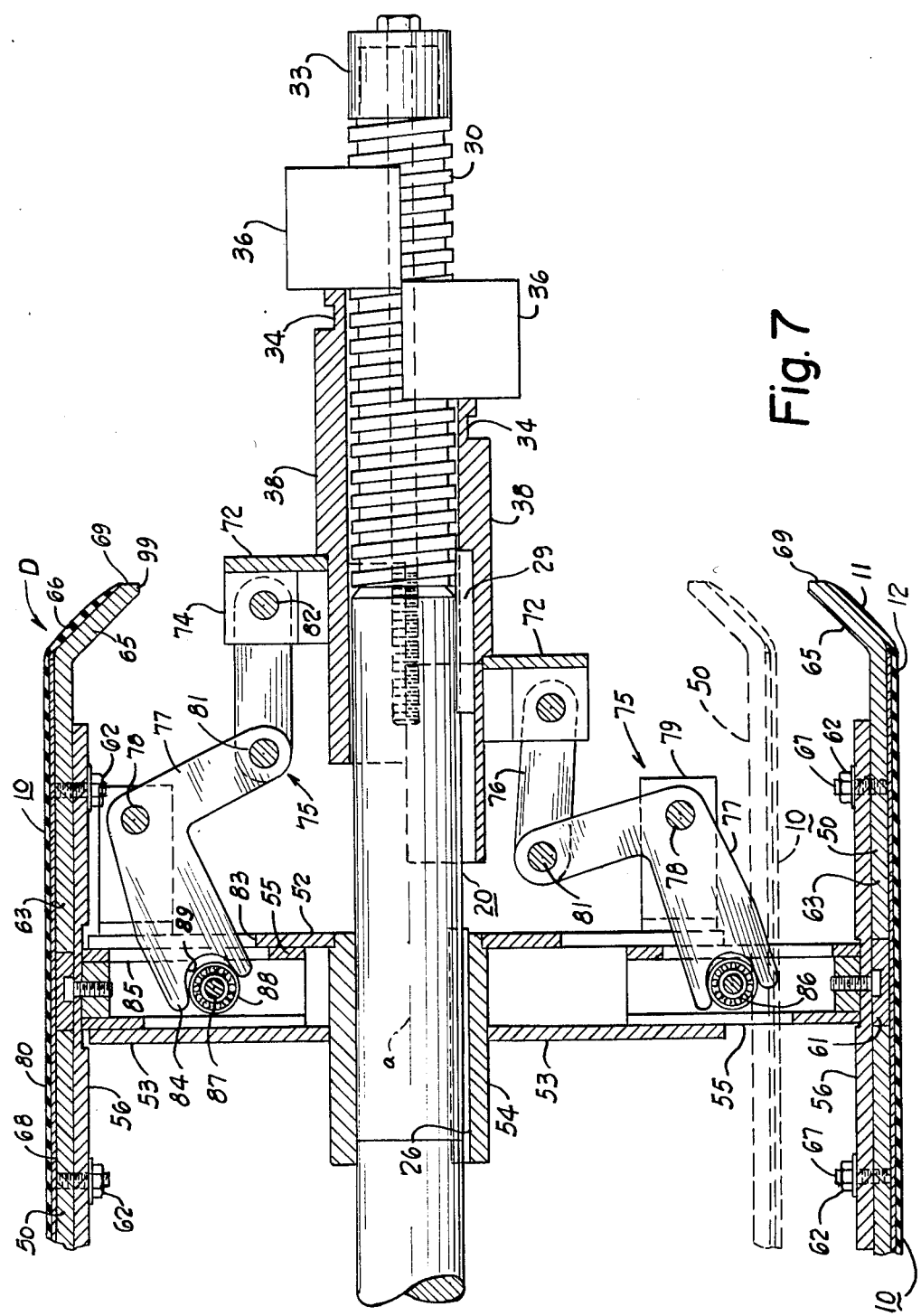
FIG. 7 is an axial sectional view similar to FIG. 5 wherein the parts below the drum axis are shown in their positions when the drum is expanded and the parts above the axis are shown in their positions when the drum is contracted.

Referring more particularly to the drawings, FIGS. 5, 6 and 7 show a unique expansible tire building drum specially designed for manufacture of tubeless radial truck tires when used on conventional automatic tire building machines. FIGS. 1 to 11 are drawn to scale to facilitate an understanding of the invention and show one preferred embodiment wherein the expansible drum is used on a conventional Model 59J automatic tire building machine as built 30 years ago by National Rubber Machinery Company (NRM) of Akron, Ohio. That machine, with a few minor changes, makes possible economical mass production of tubeless truck tires.

Automatic and semi-automatic machines have been used by tire manufacturers for several decades in producing bias tires by the flat-band method. For example, NRM Model 49 and Model 50 automatic tire building machines have been used for more than three decades in making bias-ply tires and are described in some detail in *Machinery and Equipment for Rubber and Plastics* by R. G. Seaman and A. M. Merrill published in 1952 by India Rubber World. These NRM machines are well-suited for use in the practice of the present invention.

The NRM Model 59J is an improved machine which incorporated many features of the Model 49 and which is designed to automate many tire building operations during manufacture of a wide range of single-bead and dual-bead bias truck tires.

The tire building machine shown herein is conventional and comprises a headstock assembly A, which provides a housing 1 for the main power unit and the main drive of the machine, and a center base assembly B, which is rigidly connected to the headstock and provides a support for bead setters, ply turn-up means and tread stitching means. The headstock contains the drum drive motor and supports the motor-driven drum shaft 2, and it has electrical controls on the housing 1 including an operator's push button console 3.

The center base assembly B includes inner and outer bead setting means 4 and 4a which are supported on vertical posts and mounted on slide rails to move back and forth parallel to the drum axis. These are moved axially by an air cylinder.

The assembly B also has ply turn-up and bead-stitching means 5 including two air-cylinder-operated bead stitcher arms 6 equipped for either dual-bead or single-bead tire building and motor drive means 7. In the Model 59J machine three electric motors are provided including a motor 115 for rotary motion, a motor 114 for radial motion, and a gearhead motor 116 for traverse motion. The rotary motion is controlled by a 12-cam limit switch assembly, and the radial and traverse motions of the bead stitchers are controlled by use of "command" and "feedback" potentiometer type of servo-positioning circuitry. The motors and electrical controls are conventional as described in U.S. Pat. Nos. 2,488,340 and 2,555,343.

The equipment is designed to perform the functions of bead stitching, plydown (secondary or final phase), turn-up, turn-down, tack and strip as encountered in normal manufacture of bias-ply truck tires. The strip operation, at the end of the green tire building cycle, partially breaks the tire away from the undercut portion of the conventional drum to facilitate tire removal (see U.S. Pat. No. 3,794,542).

The complete tire building cycle is preferably programmed on a conventional Jones Special Timer, the basic element of which is a drum with 36 cams cut to various contours for the control of specific functions. Adjacent to each cam is a limit switch having an actuator arm with a cam roller riding on the cam.

The ply turn-up and bead stitching means 5 is particularly important (see U.S. Pat. Nos. 2,488,340 and 3,794,542). In rotary travel the tool 18 or 43 pivots about the center line of the assembly as it is driven by motor 115. In radial travel the tool advances and recedes on a line of travel perpendicular to the drum axis. In traverse motion, the tool is driven by motor 116 on a line parallel to the drum axis. The tool contacts the carcass material on the drum under controlled pressure by pivoting about the center line of the tool support post. The motion is powered by an air cylinder and spring loading.

The center base assembly B also supports a tread stitcher assembly 8 which performs the functions of ply stitching and stitching the tread, the sidewall and the ply face. The assembly includes a traverse drive motor 117. The traverse tread stitcher motion is controlled by an 8-cam limit switch assembly.

The center base assembly B supports an optional spring-belt plydown assembly consisting of left and right subassemblies mounted on a cross-bar in front of the machine and actuated by an air cylinder. This plydown assembly performs the primary phase of the plydown operation and includes an air cylinder, spring belts and pulleys, and plydown wheels. The spring belts can be used with the expansible drum D to restrain the flaring action of the ply stock and hold the stock during setting of the beads.

The electrical equipment for the Model 59J machine is described in U.S. Pat. No 2,555,343 and includes an operator's pushbutton console, a main control panel, a one-revolution indexing device, position sensing and feedback devices drive motors foot switches (FIG. 1) and an 82-channel tape programmer. The machine also includes pneumatic equipment including valves, gauges, and piping. An automatic electrical/pneumatic device is provided to collapse the conventional drum. Conventional let-off and servicer equipment may be employed with the tire building machine.

Figure 1:
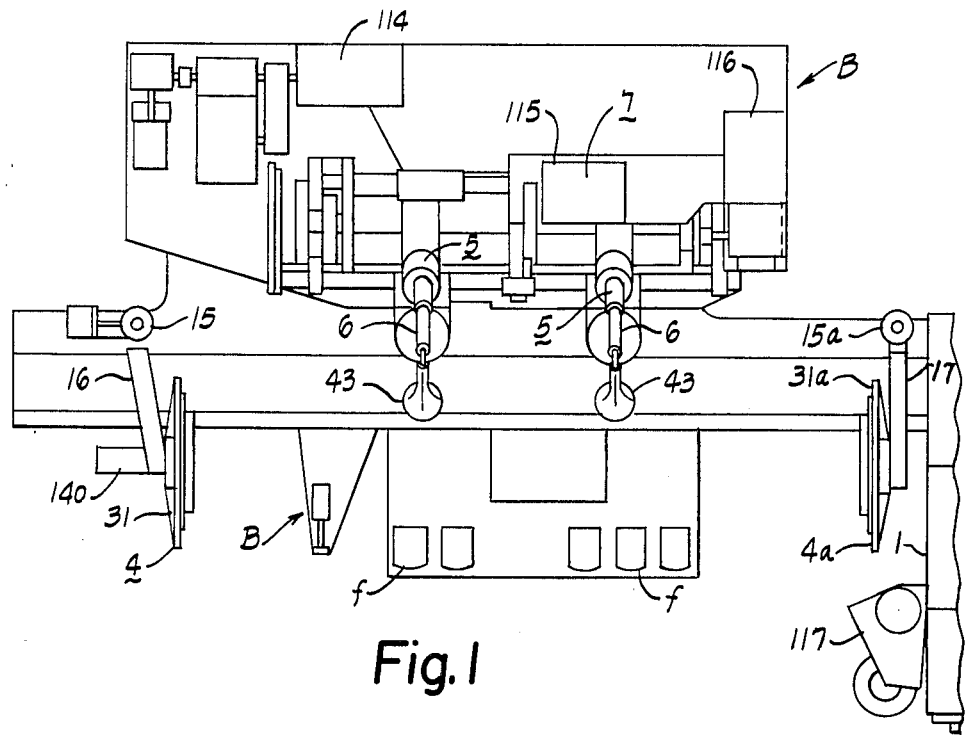
FIG. 1 is a schematic top plan view on a reduced scale with parts omitted showing an example of an automatic tire building machine which may be used in the practice of the present invention.
Figure 3A:
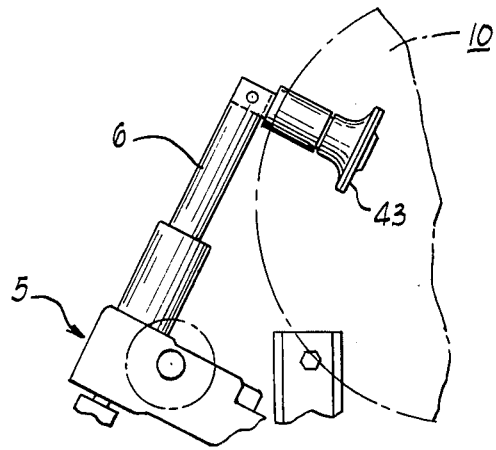
FIG. 3A is a fragmentary sectional view similar to FIG. 3 showing a modified form of stitching means.

The Model 59J machine is employed by tire manufacturers to build both single-bead and dual-bead bias-ply truck tires. In building dual-bead tires, each of the three motors 114, 115 and 116 must be controlled. The equipment illustrated in FIGS. 3 and 4 is employed to build the single-bead tires. In the single-bead sequence the required functions can be performed using the rotary motor 115 in combination with air pressure. The air pressure used in maintaining the stitching tool 18 against the stock may be high, low or intermediate as desired. Auxiliary equipment may be employed for building the dual-bead tire including dual-bead stitcher wheels 43 as shown in FIGS. 1 and 3A. A special drum may be employed having an annular recess at each shoulder to receive the dual bead (see U.S. Pat. Nos. 2,339,551 and 3,794,542).

The NRM Model 59J was designed for building truck tires having bead diameters from 18" to 24.5" with a single operator operating the foot controls f. The maximum ply width is 44" and the maximum ply overhang on each side is 9". The machine is well suited for building tires with bead diameters of about 20" such as the common 10.00×20 size, and tubeless tires with common bead diameters of 22.5" and 24.5".

Figure 2:
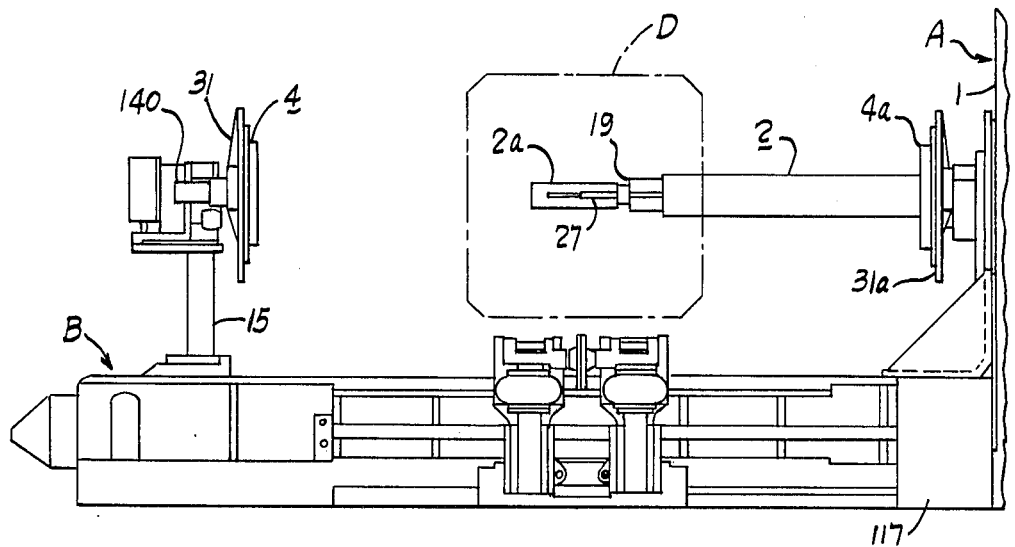
FIG. 2 is a front elevational view of the machine of FIG. 1 with parts omitted.
Figure 8:
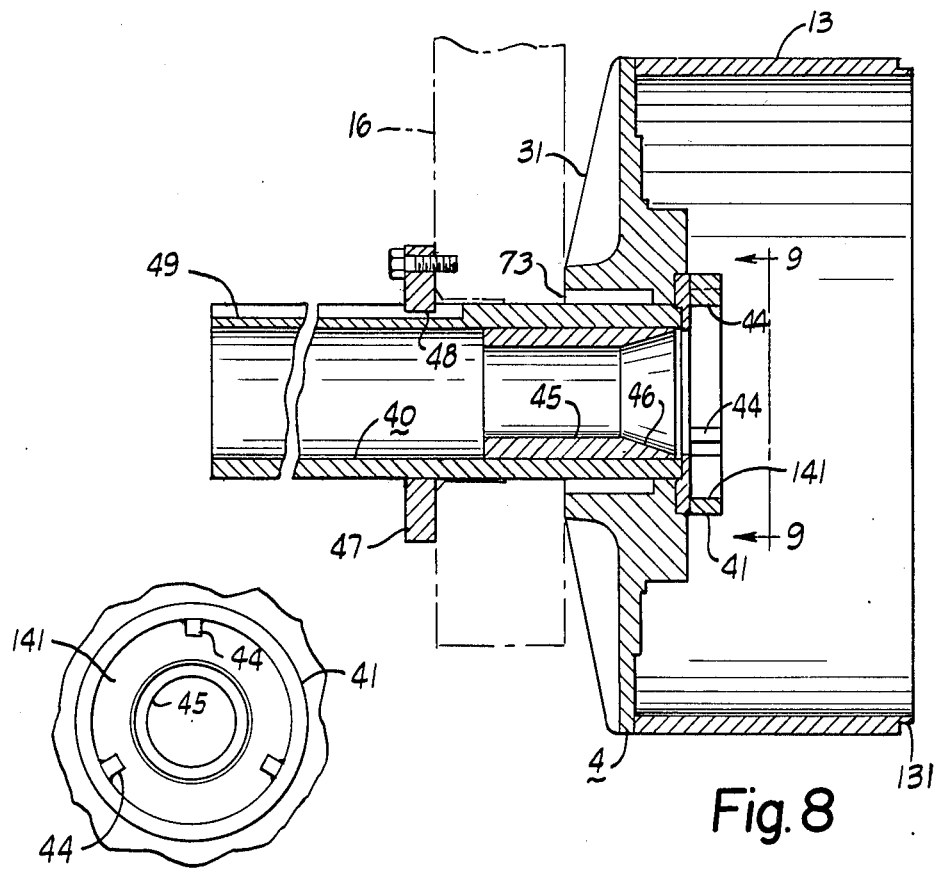
FIG. 8 is a vertical sectional view on a reduced scale with parts omitted showing the bead setter with a torque tube and associated parts.
Figure 9:
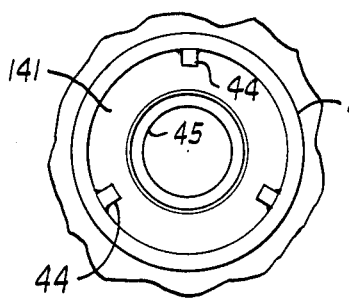
FIG. 9 is an end view of the torque tube.

FIGS. 2 to 4 illustrate a typical Model 59J automatic tire building machine as has been used for three decades to manufacture bias-ply truck tires. The present invention makes it possible, with a few simple modifications described hereinafter, to use the same equipment to make tubeless and tube-type radial truck tires having a carcass containing one or more cord-reinforced plies as shown, for example, in FIG. 15, which is drawn to scale. The modifications required in connection with the radially expansible drum D are minor as indicated in FIGS. 5 and 8. They involve addition of an externally threaded sleeve 30 to the original hollow shaft extension 20 of the Model 59J machine and the addition of an air cylinder and an axially movable torque tube 40 to the outer bead setter. A simple electrical control is employed to actuate said air cylinder (so as to cause expansion or contraction of the drum D).

The expansible drum D is unique and makes it possible to mass produce high-quality radial truck tires at minimum cost in a two-stage process using conventional tire building machines. The drum functions in such a manner that the 30-year-old Model 59J automatic tire building machines perform admirably in the production of tubeless radial truck tires and are able to maintain the highest safety and quality standards.

An important feature of the tire building drum of this invention is the provision of a rigid open-ended expansible cylindrical shell 10 with beveled shoulders 11 extending axially outwardly at opposite ends of the drum and inclined at an angle of from 40° to 50° relative to the drum axis. An annular sheath or cover 12 of elastic material extends around and conforms to the shoulders 11. The rigidity of the expanded drum assures correct placement and dimensions of tire components and adequate stitching pressure applied during tire building so that proper standards are maintained.

Another feature of great practical importance is the ease of adjustment of both the length and the diameter of the drum and the ability to build tires of many different sizes with precise control of drum expansion. The drum D of FIGS. 5 to 7 is particularly well suited for this purpose as will be apparent from the description which follows. The combination of precision and rigidity when building a tire of any desired size makes possible greater precision in setting and locating the bead and better control of the bead-to-bead cord length so that greater uniformity is achieved.

The Model 59J machine shown herein has conventional bead setting means comprising cylindrical bead setting rings 13 and 14 supported at opposite ends of the tire building drum on vertical posts 15 and 15a by horizontal arms 16 and 17, respectively. Each of said rings is detachably mounted on a freely rotatable spider 31 or 31a which is adapted to support a number of cylinders of different bead diameters. The post 15 provides a pivot for the arm 16 which swings 90° to a retracted position to facilitate removal of the completed tire carcass. A latch which locks the arm in its work position is released by a foot-controlled air cylinder. The machine has a pair of conventional freely rotatable ply turn-up rolls 18 mounted on the stitcher arms 5 and other conventional stitching means, such as the stitching wheels 9 of FIG. 3 (see also FIGS. 10 and 11).

The Model 59J is normally provided with a hollow shaft extension 20 with an enlarged rear cylindrical portion 21 which fits on the reduced cylindrical end portion 2a of the main cantilever shaft 2. The shaft extension has a front cylindrical portion 22 of the reduced diameter and is mounted on the machine shaft with a long bolt 23 which screws into an internally threaded opening at the end of shaft 2. The portion 21 is usually provided with a plurality of narrow axial slots 25 to facilitate expansion and has an axial key slot to receive a key 27. The key fits in an axial key slot 26 of the drum hub 54 to drive the drum.

In accordance with this invention, the shaft extension 20 is modified by cutting an axial key slot 28 and adding a key 29 in that slot. If desired one or more of the slots 25 can be welded as shown in FIG. 5 to provide more strength. An externally threaded internally cylindrical sleeve 30 is mounted on the portion 22 and has a short key slot to receive the key 29. The sleeve 30 is held against the tapered shoulder 32 of shaft extension 20 by an externally cylindrical end cap 33 which fits the end of said extension and which is held in place by the bolt 23.

Actuating means 35 are provided for causing expansion and contraction of the drum D in response to rotation of the drum in a forward or reverse direction using power from the main drive motor of the Model 59J machine. As herein shown, an annular internally threaded actuating member 36 is screwed onto the sleeve 30 and has three peripheral slots 37 which may be engaged to stop the rotation temporarily and to cause the member 36 to move axially in response to drum rotation. The actuating means 35 includes a cylindrical sleeve 38 having an internal diameter greater than the external diameter of the threaded sleeve 30 and having an axial key slot 39 to receive the key 29. If desired the two axially aligned keys 27 and 29 can be replaced by a single long key.

The sleeve 38 has an annular groove 34 (FIG. 7) which receives annular bearing means 42 (FIG. 5) carried by the actuating member 36. The bearing means permits the actuating sleeve 38 to rotate relative to the member 36 while preventing relative axial movement so that they move axially in unison.

The conventional Model 59J tire building machine is modified by adding means for resisting rotation of the actuating member 36 at predetermined times during each cycle to effect drum expansion or contraction, depending on the direction of drum rotation. Such means is preferably mounted to move into and out of engagement with the member 36 to stop rotation thereof and is preferably mounted on the outer bead setting means 4, for example as in the embodiment of FIGS. 8 and 9. Optionally the inclined arm 16 can be replaced with a straight arm (17) to provide additional space. A simple modification of the bead setting means is preferred wherein the usual guide tube for receiving and centering the shaft extension 20 is replaced by a special non-rotatable torque tube 40 moved axially by the piston of an air cylinder 140 carried by the arm 16. The tube 40 has a wrench head 41 with a recess 141 to receive the member 36 and inwardly projecting ribs 44 (FIG. 9) which fit in the three axial grooves 37 of actuating member 36 to stop rotation thereof. An inner sleeve 45 is mounted within tube 40 and has a tapered surface 46 to guide the cap 33 and the sleeve 30 as sleeve 45 moves axially over the cap during expansion of the drum.

The torque tube 40 is located inside the bearings 73 of the freely rotatable spider 31 and is mounted to slide axially without interfering with rotation of the bead seeting ring 13. As shown a flat annular plate 47 is rigidly mounted on the supporting arm 16 of the bead setting ring concentric to the tube 40 and has a rib or key 48 which fits in an axial keyway 49 of the torque tube to prevent rotation while permitting axial movement of the tube by the air cylinder 140.

It is thus seen that only a few simple modifications of a conventional Model 59J tire building machine are needed to adapt that machine for use with the expansible drum D of FIGS. 5 to 7 and that the main motor drive of the machine provides all the power required for rotation, expansion and contraction of the drum. It will be apparent from the drawings how the segments of the drum are moved radially in response to axial movement of the actuating member 36 and its associated sleeve 38 and how the segments are rigidly supported on the drum in all of the radially adjusted positions. It will be understood that the drum may have an array of 6 to 10 or more segments at each end of the drum and that various lever means may be employed to effect the desired movement.

As herein shown the drum D has a generally cylindrical rigid shell 10 formed of a series of closely spaced pairs of elongated segments 50 mounted on a central supporting means 51 for radial movement so that the shell can be expanded 35% or more. The gaps between segments are bridged by sheet metal cover plates 68. The segments and plates are covered by an annular cover 12 of elastic material, preferably natural rubber. The segments 50 extend axially outwardly from the supporting means 51 in cantilever fashion to define an externally cylindrical shell 10 open at both ends with beveled shoulders 11 inclined at an angle of from 40 to 50 degrees relative to the drum axis a. The elastomeric cover 12 covers the beveled shoulders 11 of the segments 50 and has thick end portions 66 which conform to the shape of said shoulders as the segments move radially outwardly. The continuous cover applies pressure to the ply stock uniformly as the drum expands and enables the wire or textile cords of the rubber tire carcass material to retain substantially uniform spacing during the drum expansion.

The inclination of the beveled shoulders is important to permit economical high-speed production, and facilitates proper positioning of the overhanging portions of the tire carcass material (i.e., underply and liner). The shoulders provide an ideal rigid support during stitching operations. The inclination of the shoulders is preferably about 45° as shown in FIG. 5, and the outer end of each segment 50 is preferably shaped as shown in that figure to permit turn up and stitching operations by the Model 59J machine in the normal manner.

FIGS. 5 and 6 illustrate one preferred embodiment of the radially expansible drum suitable for manufacture of modern tubeless radial truck tires. As shown the central supporting means 51 comprises flat parallel plates or disks 52 and 53 rigidly connected to an annular hub 54, a series of regularly spaced radial supporting tubes 55 mounted for radial sliding movement between the disks, and an array of regularly spaced arcuate axially elongated supporting plates 56 rigidly connected to the tubes 55 to define a segmental expansible shell. The tubes 55 are of rectangular cross section and are guided radially by the disks 52 and 53 and by flat plates 24 extending between the disks and engaging the opposite sides of said tubes.

Means are provided for adjusting the effective radial length of each tube at 55. As shown in FIG. 5, a short metal block 58 is welded to the outer end portion of each tube 55 and has an internally threaded bore to receive a replaceable screw 59. A tube extension 60 of the same cross section as the tube 55 is mounted on the block 58 and is clamped between the tube 55 and the recessed central portion of the associated supporting plate 56. Radial adjustment is effected by removing and replacing the tube extension 60 with a similar extension of a different length.

Means are provided for adjusting the axial length of the drum to obtain desired "drum sets" (distance between beads or cord length). Instead of providing segments extending the full length of the drum, the segments 50 are arranged in axially aligned complementary pairs (50a and 50b) with a replaceable arcuate spacer 61 extending between the ends of each pair and having the same arcuate cross section. Means are provided for clamping each segment 50 to the associated supporting plate 56 in its axially adjusted position including a clamping nut 62. The axial length of the drum D of FIG. 5 is adjusted by releasing the segments, replacing the spacers 61 with spacers of a different axial length, and retightening the nuts 62. A similar arrangement is shown in FIG. 7.

As shown in FIG. 6, the segments 50 have an arcuate cross section and are regularly spaced around the drum periphery to define an externally cylindrical segmental shell with beveled shoulders. All of the segments are of the same size. Sheet metal members 68 of arcuate cross section are provided to bridge the spaces between segments. Each segment has a main portion 63 of straight axial cross section with a straight axial slot 64 and has an inclined end portion 65 defining a flange or shoulder of straight axial cross-section (i.e. conical curvature). The portion 65 has a flat end face 69 perpendicular to the portion 63 and a narrow cylindrical surface 99. For best results, the tapered outer surface 98 of the end portion 65 (FIG. 5) should be inclined at an angle of about 45° relative to the drum axis.

Each slot 64 has a T-shaped cross section of a size to receive the head of a threaded clamping stud or bolt 67 which fits the nut 62. The slot permits axial sliding of the segment 50 to adjusted positions when the nut 62 is loosened slightly.

Optionally a similar slotted arrangement may be provided to permit guided axial adjustment of axially spaced sheet metal members 68. It is preferable, however, to provide replaceable members 68 extending substantially the full length of the drum and terminating at the shoulders as indicated in FIGS. 5 and 7. All of the segments 50 may be provided with flat surfaces 57 to engage and locate the sheet metal members 68 and to provide the expanded drum with a more nearly cylindrical outer surface.

The cover sheet 12 provides a continuous imperforate annular elastic sheath extending the full length of the drum, conforming to the shape of the drum shoulders, and covering the entire outer surface of the drum. The outer edges 112 of the cover are located at the ends of the drum in planes perpendicular to the drum axis a and do not cover the bead-engaging end faces 69 of the drum segments.

The main cylindrical portion 80 of the cover is thin to minimize the power requirement for drum expansion. The tapered end portions 66 preferably have a thickness several times that of the portion 80 to provide rigidity at the drum shoulders and to provide a stiff or rigid bridge covering the gaps between the portions 65 of the drum segments. This eliminates any need for interfitting lateral fingers or sheet metal bridges at said gaps. The rubber sleeve holds and positions the cover plates 68 during expansion. The preferred cross section shown in FIG. 13 also provides the proper contour for building the tubeless tire of FIG. 15.

Prior to this invention, a preferred drum for an automatic tire building machine of the type shown herein was a simple open-ended cylindrical drum having rounded ends as shown, for example, in U.S. Pat. Nos. 2,464,020 and 4,292,112. The bead rings were placed against the end of the drum in alignment with the radially inner cylindrical surface of the drum. The rigid drum D of the present invention permits the bead rings to be placed in a similar manner in alignment with the radially inner cylindrical surfaces 99 as shown in FIG. 13. A high degree of precision may be maintained in the bead setting operation.

Like the cylindrical drums previously used with the Model 59J machine, the drum D is open at the ends and so shaped as to permit the stitching wheels or turn-up rolls to move inside the drum during stitching at the inner side of the bead. As indicated in FIG. 13, the narrow inner cylindrical surface of the drum at 99 does not prevent swinging of the turn-up roll 18 or other stitching wheel to a position inside the drum during stitching of a chafer strip or the like near the toe of the tire.

The optimum size of the flange at 65 depends somewhat on the desired bead and sidewall profile. The width of surface 69 is preferably no greater than the thickness or diameter of the wire bead ring 70 or 70a and is preferably such that the flipper 71 extends over the rounded end portion of the rubber cover at 66 and terminates at least about 2 cm from the outer end surface 69. The beveled surface of the drum shoulder preferably extends a width sufficient for easy application of fillers, reinforcing and finishing strips, and other sidewall components.

The actuating means shown for expanding and contracting the drum includes a flat annular plate 72 welded to the actuating sleeve 38 and lever means 75 connected between said plate and the radial tubes 55 for moving the supporting plates 56 radially in response to axial movement of the actuating sleeve. As herein shown, eight regularly circumferentially spaced pivot blocks 74 are rigidly connected to the plate 72 in axial alignment with the eight tubes 55.

The lever means 75 comprises a pair of parallel links 76 and a rocker arm lever 77 associated with each tube 55. Each lever is mounted on a pivot pin 78 extending between a pair of mounting brackets 79 carried by the housing disk 52. One end of the lever is mounted between the links 76 on a pivot pin 81. A similar pivot pin 82 carried by said links extends through the associated block 74.

The free end of each rocker arm lever is operably connected to the associated tube 55 to cause radial movement of one pair of segments 50 in response to axial movement of the plate 72. As shown, the housing disk 52 has eight regularly spaced radial slots 83 which receive the bifurcated end portions 84 of the levers and permit radial swinging thereof. Similar radial slots 85 are provided in the tubes 55 for the same reason and to accommodate cylindrical bearing means 86 which engage the bifurcated end portions 84 of the levers 77.

The inner race of the bearing means for each lever 77 is mounted on a short pin 87 carried by the associated tube 55. A cam and follower arrangement is provided in which the outer race 88 of the bearing means engages a cam surface of a rounded recess 89 in the end portion 84 of the lever. The recess is preferably accurately machined to eliminate play and to assure that the outer cylindrical surface of the outer race remains in contact with the cam surface at all times.

The actuating means for the drum D as shown in FIGS. 5 and 6 including the threaded sleeve 30, the axially movable actuating members 36 and 38 and the lever means 75 are designed to make effective use of the power supplied to the motor-driven drum shaft 2 of the Model 59J machine and to provide a high force for gradually expanding the heavy carcass material employed in the building of truck tires.

The drum D shown herein is designed for use with the standard turnup and stitching tools used on the Model 59J tire building machine. It will be understood that such machine commonly employs different turn-up, ply-down and stitching means in the manufacture of different types of tires. For example, the conventional tread stitching means 8 shown in FIG. 3 is commonly replaced by axially spaced stitching means 90 of the type shown in FIGS. 10 and 11 mounted in front of and below the drum.

Such means is conventional and includes freely rotatable stitching wheels 91, 92, and 93 mounted for rotation on a support 94 having a base 95 and arms 96 and 97 for supporting the wheels 92 and 93, respectively. This equipment is supplied by NRM for use on its Model 59J machine and can be used in the same or a modified form in the building of tubeless radial truck tires according to the present invention.

When building large dual-bead truck tires on the drum D it may be desirable to employ auxiliary equipment other than that shown herein or that shown in FIG. 3A. Although the invention is used primarily for manufacture of single-bead radial tires, it has advantages in the building of dual-bead truck tires because of the elimination of wrinkles and air pockets prior to application of the second bead.

The embodiment of FIGS. 1 to 7 is designed for manufacture of single-bead truck tires as exemplified by FIGS. 13, 14 and 15 using a two-stage process. The process for making the stage-I tire carcass is illustrated in FIGS. 12 to 14. FIG. 12 shows the drum D in its original contracted position (FIG. 5) at the beginning of the cycle after there has been applied to the drum a sheet s of tire carcass material consisting of the usual inner liner covered by at least one cord-reinforced ply. FIGS. 13 and 14 show the drum D in its fully expanded position for building of the green tire carcass. The radial expansion of the drum and its elastic cover 12 results in a substantially uniform increase in the spacing of the cords at any location along the length of the drum. The beveled surface of the drum shoulders 11 provides a surface for uniform expansion and causes the cord spacing to gradually increase from the radially inner end of said surface to the outer periphery. The same is true when the carcass material comprises several fabric-reinforced plies.

When the segments 50 of the drum arrive at the expanded position of FIG. 13, the flared end portion b of the tire carcass material has a position generally as indicated in broken lines in that Figure and the bead setting ring 13 is located beyond said end portion and supports a wire bead bundle 70 concentric to the drum with the bead ring on the annular surface 131 (FIG. 8) axially aligned with the radially inner surfaces 99 of the shell 10 at the drum shoulder. The bead bundle may include a rubber filler or flipper 71. The rings 13 and 14 at the ends of the drum are then advanced axially to set the beads 70 against the smooth wrinkle-free material b and adhere a portion of each bead bundle to the tire carcass material on the drum. Each bead setting ring is then separated from the bead wire bundle and retracted while initiating operation of the ply turn-up arms 6. The latter are automatically controlled in the conventional manner to provide radial, rotary and/or transverse motion and to turn the axis of the turn-up rolls 18 as indicated in broken lines in FIG. 13 so that the end portion b of the tire carcass material is flared and pulled up around the wire bead bundle and stitched against the bead flipper at the drum shoulder. The turn-up and stitching operation is similar when using a wire-reinforced monoply layer and when using several fabric-reinforced plies.

The stage-I tire building then proceeds with the drum in the same expanded position to form a green tire carcass including the sidewall and other parts such as chafer strips, overplies, etc. The completed green tire carcass T, shown generally in FIG. 14, can easily be removed by rotating the drum in a direction to effect retraction of the segments 50 and contraction of the segmental shell 10 to an outer diameter less than the bead diameter. The carcass is then transferred to any suitable stage-II tire building machine (see U.S. Pat. Nos. 3,923,572 and 4,214,941) for application of the circumferential belts and the tread portion after the carcass is expanded to a substantially toroidal shape.

When building a stage-I carcass by conventional methods, it is necessary to effect stitching from the middle of the drum to the drum shoulders to remove entrapped air. Such a stitching operation is not needed and may be omitted in the practice of the present invention because when the drum expands, air is removed.

FIG. 15, drawn to scale, shows a tubeless monoply 11R24.5 steel-belted radial tire 100 as actually produced in the two-stage process of this invention using the drum D of FIGS. 5 to 7. The tire employs standard bead wires 70a of axially elongated generally diamond-shaped cross-section as are generally used for tubeless truck tires. The complete green tire (except the circumferential belts 106 and the tread portion 107) was built on the first-stage drum D.

The tire carcass is of conventional radial monoply construction and is reinforced by long steel wires 101 extending from bead to bead in planes containing the tire axis. As shown the wire-reinforced ply layer 102 containing the wires 101 is turned up around the beads and adhered to the bead bundle 71. A wire-reinforced layer 103 covers the layer 102 near each bead ring, and a double-fabric reinforced chafer strip 104 covers the layer 103 and extends substantially from the toe to the outer end of the flipper 71. A rim-engaging layer 105 forms the toe and heel of the tire in each bead region and extends from the toe to the sidewall portion 108. At least one filler strip 109 is sandwiched between the flipper 71 and the chafer strip 104 to provide the desired profile or wall thickness. An air-impervious inner liner 110 covers the entire inner surface of the carcass, and the usual undertread 111 is provided between the three circumferential belts 106 and the tread portion 107.

The tapered shoulders 11 of the drum D are of such size and shape as to facilitate mass production of tubeless radial tire carcasses on 30-year-old automatic tire building machines such as the NRM Model 59J shown herein. The shoulders 11 provide an ideal rigid support and facilitate high-speed automatic operation during application and stitching of layers 102 to 105 and 109 and during stitching of the sidewall portion 108. The shape of the drum D is ideal for all stitching operations.

As will be apparent from FIG. 13, the bead 70 or 70a is positioned in such a manner as to minimize bead rotation problems which can be particularly sever when using bead rings of axially elongated cross section such as the beads 70a. The specially shaped drum D provides remarkable advantages in the manufacture of tubeless truck tires not only with respect to tire quality but also with respect to cost and ease of manufacture of tires, such as shown in FIG. 15.

In making a typical tubeless radial truck tire of the type shown in FIG. 15 in accordance with this invention, a rubber sheet s of carcass ply stock is employed comprising a cord-reinforced layer 102 with one or more plies and an impervious inner liner 110 with a uniform thicknesss of from 1 mm to 2 mm. The ply layer 102 shown in FIG. 15 is reinforced by conventional heavyguage parallel wire cords 101. When the tire employs several plies reinforced by textile cords, instead of a wire-reinforced monoply layer, the ply layer 102 is even thicker depending on the number of plies. A conventional 3-ply tubeless radial tire having a carcass reinforced with textile fabric cords can have essentially the same cross section as the monoply tire of FIG. 15.

The rubber strip used to form the sidewall layer 108 has a substantial thickness and overlaps layers 104 and 109 as shown to provide the radially inner portion of the tire sidewall with the desired thickness which may be several times the thickness of the radially outer portion.

The radially expansible drum is well suited for manufacture of large pneumatic rubber tires other than the heavy-duty truck tire shown herein. The tire constructions and sidewall profiles will, of course, differ in tires of different types. A construction of the general type shown in FIG. 15 for heavy-duty truck tires is quite common in which each sidewall has a minimum thickness at its radially outer portion and gradually increases in thickness to a maximum thickness at or near the rim-engaging bead portion of the tire.

In a tire of this type the maximum thickness may, for example, be from 2.5 to 3.5 times the minimum thickness and is commonly in the range of from about 3 cm to about 4 cm in tires having bead diameters of from 45 to 65 cm. When building tires in these size ranges, the beveled shoulders 11 of thd drum D may, for example, have a uniform width of from 5 cm to 10 cm. Such width can vary substantially depending on the type of tire being built and is usually at least about one-tenth of the bead diameter of the tire.

Tubeless radial tires of the type shown in FIG. 15 made by the two-stage process of the present invention have excellent wear and performance characteristics and meet the highest quality and safety standards. They can be operated under severe operating conditions and have a quality at least equal to that of comparable production tires produced by conventional methods on expensive automatic machines. The present invention makes it possible for the first time to mass produce heavy-duty steel-belted tubeless radial truck tires of the highest quality economically in a variety of sizes using inexpensive existing equipment.

I claim:

1. In a tire building machine designed for mass production of green bias tires by the flat-band process having a motor-driven cantilever shaft; an externally cylindrical open-ended tire building drum mounted on said shaft; bead setting means, ply turn-up means and tread stitching means engageable with said drum; and automatic control means associated with said bead setting means, said turn-up means and said tread stitching means for effecting a predetermined sequence of operations during building of a green tire; the improvement wherein (a) said tire building drum has an expansible open-ended circumferentially discontinuous cylindrical shell formed of the upper surfaces of each of a series of closely spaced axially elongated rigid segments with rigid beveled shoulders which extend circumferentially discontinuously and has an annular sheath of elastic material sheathing said shell to provide an elastomeric cylindrical building surface, said sheath extending the full length of the drum and having thickened annular portions conforming to the drum's beveled shoulders;

(b) said segments are mounted on a central supporting means for simultaneous radial outward movement to increase the drum diameter at least 35 percent while maintaining said upper surfaces as a discontinuous cylindrical surface and to extend axially outwardly from said supporting means in cantilever fashion with said rigid beveled shoulders extending axially outwardly at opposite ends of the drum, each segment having an inclined end portion providing an integral flange at one of the drum shoulders upon which the ends of the carcass are coextensively laid by said radial outward movement;

(c) actuating means are provided for causing each segment to move radially in unison with the other segments during drum rotation to maintain the cylindrical shape of the shell and conformation of said sheath to the shape of said rigid beveled shoulders;

(d) each bead setting means moves a wire bead ring against the carcass ply material at the end of the drum and places the bead ring against the ends of the segments radially inwardly of said rigid beveled shoulders; and, (e) said automatic control means causes the ply turn-up means to turn the outer portions of the tire carcass material up over the bead rings and to press said portions against the carcass material on the beveled shoulders.

2. The improvement according to claim 1 wherein said machine has motor-driven ply turn-up means including freely rotatable stitching rolls and arms for swinging the rolls into and out of engagement with the drum shoulders at both ends of the drum.

3. The improvement according to claim 1 wherein the beveled shoulders formed by the thickened end portions of said cover are inclined at an angle of from about 40° to about 50° relative to the drum axis.

4. The improvement according to claim 1 wherein said actuating means includes an actuating member mounted to move axially on the drum shaft and means for moving the segments radially in response to axial movement of said actuating member.

5. The improvement according to claim 1 wherein an externally threaded sleeve is mounted on the end portion of said cantilever shaft, an internally threaded actuating member is mounted on said sleeve, means are provided for temporarily engaging said actuating member to resist rotation thereof to cause said member to move axially a predetermined distance in response to drum rotation, and means are provided for moving the segments radially in response to axial movement of said actuating member.

6. The improvement according to claim 1 wherein the segments of said cylindrical shell are mounted on a series of regularly circumferentially spaced radial arms, each having an axially elongated plate which supports a pair of said segments in axially aligned positions, and means are provided for rapid adjustment of the axial length of said shell and the radial length of said arms.

7. The improvement according to claim 5 wherein a torque tube is mounted on the outer bead setting means in axial alignment with said cantiliever shaft and has a central opening to receive and guide said externally threaded sleeve and a head portion engageable with said actuating member to stop rotation thereof, and means are provided for moving said tube axially into and out of engagement with said actuating member.

* * * * *